United States Patent
Karlsson et al.

(10) Patent No.: US 8,100,811 B2
(45) Date of Patent: Jan. 24, 2012

(54) AUTOMATIC DISENGAGING/ENGAGING METHOD OF A CLUTCH DEPENDENT POWER TAKE-OFF

(75) Inventors: Lars Karlsson, Göteborg (SE); Svante Karlsson, Västra Frölunda (SE)

(73) Assignee: Volvo Lastvagnar AB, Göteborg (SE)

( * ) Notice: Subject to any disclaimer, the term of this patent is extended or adjusted under 35 U.S.C. 154(b) by 423 days.

(21) Appl. No.: 12/441,386

(22) PCT Filed: Sep. 11, 2007

(86) PCT No.: PCT/SE2007/000787
§ 371 (c)(1),
(2), (4) Date: Jun. 24, 2009

(87) PCT Pub. No.: WO2008/036012
PCT Pub. Date: Mar. 27, 2008

(65) Prior Publication Data
US 2009/0305845 A1  Dec. 10, 2009

Related U.S. Application Data

(60) Provisional application No. 60/826,048, filed on Sep. 18, 2006.

(51) Int. Cl.
*B60W 10/04* (2006.01)
*B60W 10/02* (2006.01)
*B61H 13/36* (2006.01)

(52) U.S. Cl. .................. 477/36; 192/3.63; 192/220.1
(58) Field of Classification Search .............. 477/36, 477/79; 74/15.66
See application file for complete search history.

(56) References Cited

U.S. PATENT DOCUMENTS
7,487,025 B2 * 2/2009 Steen et al. ................ 701/51
7,931,560 B2 * 4/2011 Karlsson et al. ........... 477/111

FOREIGN PATENT DOCUMENTS
| WO | 2004030973 A1 | 4/2004 |
| WO | 2004041576 A1 | 5/2004 |
| WO | 2004062957 A1 | 7/2004 |
| WO | 2005058629 A1 | 6/2005 |

OTHER PUBLICATIONS
International Search Report for corresponding International Application PCT/SE2007/000787.

* cited by examiner

*Primary Examiner* — Dirk Wright
(74) *Attorney, Agent, or Firm* — WRB-IP LLP

(57) ABSTRACT

An automatic disengaging method for a master clutch dependent power take-off (PTO) arranged in a vehicle for preventing undesired movement or actions of the implements associated with the PTO and undesired wear of a clutch collar (release bearing). The PTO is driven by an engine via a master clutch between a crankshaft of the engine and an input shaft in a gearbox. The gear box further comprises an output shaft which is powered by the input shaft, optionally via an intermediate shaft. A power take-off is connected to the input shaft or, optionally, to the intermediate shaft. The system further includes a control unit connected to the master clutch and the gear box. When the control unit registers that the master clutch is disengaged, a gear is engaged in the gearbox and certain conditions are fulfilled (e.g. a parking brake has been actuated for a certain time), the control unit performs the operations of putting the gearbox in a neutral position, disable the power take-off, if the power take-off is enabled, and engage the master clutch.

10 Claims, 1 Drawing Sheet

AUTOMATIC DISENGAGING/ENGAGING METHOD OF A CLUTCH DEPENDENT POWER TAKE-OFF

BACKGROUND AND SUMMARY

The present invention relates to a security system preventing undesired engagement of the clutch-dependent power take-off (PTO) for a vehicle provided with a clutch-dependent PTO arranged on the gearbox of the vehicle.

In order for it to be possible to handle the load on a truck effectively, load-handling equipment is necessary. The commonest examples of such equipment are tipping gear and cranes. Also common are hook loaders, refuse-handling units, rotating cement mixers, flushing units and air compressors for loading or unloading bulk loads.

In order to utilize the driving power of the vehicle engine to drive the load-handling equipment as well, a power take-off (commonly called PTO) is required. The driving power from the PTO can be transmitted either mechanically via a propeller shaft or belts or hydraulically by virtue of a hydraulic pump being mounted on the PTO.

PTOs are divided into clutch-independent and clutch-dependent PTOs. The clutch-dependent PTOs are mounted on the gearbox and are usually driven by the intermediate shaft of the gearbox. This means that the PTO is clutch-dependent, that is to say the PTO stops when the clutch between the engine and gearbox of the vehicle is disengaged. Depending on whether or not the gearbox is equipped with a split gear, the ratio between the engine and the power take-off can be influenced, clutch-dependent PTOs are suitable for load-handling equipment which is used when the vehicle is stationary, for example tipping units, cranes, hook loaders, pumps for emptying/filling from various containers and air compressors for loading or unloading bulk loads.

In WO 2004/030973 is shown an automatic gearbox of the automated stage-geared gearbox type which serves as an example of a transmission system suitable for the present invention. This type of gearboxes have become increasingly common in heavy-duty vehicles as microcomputer technology has developed further and made it possible, with a control computer and a number of actuators, for example servo motors, to precision-regulate engine speed, engagement and disengagement of an automated disk clutch between the engine and the gearbox and also the internal coupling means of the gearbox in such a way and in relation to one another so that gentle shifting is always obtained at the correct engine speed. Further details and advantages of such an automatic gearbox may be found in WO 2004/03097.

According to the known art for the above mentioned type of automated stage-geared gearbox, there are several steps performed either automatically or manually when the driver of the vehicle wishes to engage the clutch-dependent PTO in order, for example, to drive a pump for filling/emptying a tank arranged on the vehicle. One necessary step in order to use the PTO for a clutch-dependent PTO is to be sure that the master clutch between the engine and the gearbox of the vehicle is engaged. On the other hand, the disengagement of the master clutch may also be used as a security precaution to be sure that the PTO will be disabled. A driver who puts the master clutch in a disengagement position should therefore be able to rely on the fact that the PTO is disabled.

However, today is the control of the drive power system, including the gearbox, the engine and the drive power train, highly automatized. The control system is programmed to make the power drive system to perform certain operations such as idling, gear shifting, braking and the like operations which not originate from inputs from the driver but are programmed operations which occur depending on processed signals of data representing various states of the vehicle or engine in order to perform certain measures.

Hence, there exists a need of further improved security for vehicles provided with a PTO system and automatized gear shift systems to prevent undesired movement or actions of the implements associated with the PTO.

The method according to an aspect of the invention describes an automatic disengaging method and an automatic engaging method for a clutch-dependent PTO arranged in a vehicle. The PTO is driven by an engine, arranged in a vehicle, via an automated master clutch which engages and disengages the master clutch between a crankshaft of the engine and an input shaft in an automatic gearbox. The gearbox also comprises an output shaft powered by the input shaft for driving the wheels of the vehicle and a power take-off, which is arranged on the automatic gearbox. The output shaft may optionally be powered by the input shaft via an intermediate shaft. The power take-off is connected to the input shaft, or in case of the existence of an intermediate shaft, it may also be connected to the intermediate shaft. At least one control unit for controlling the gearbox and the master clutch, preferably also the engine as well is arranged in the vehicle. The control unit receives input data of vehicle characteristics in order to provide relevant outputs to control the engine and transmission of the vehicle. In addition, the control unit preferably has a memory for storing of certain settings of the engine and transmission system.

In a first embodiment of the method, an aspect of the invention is characterized by the steps:

1. The control unit registers that:
   the master clutch is disengaged;
   a gear is engaged;
   There is an indication that there is a desire to automatically put the gearbox in a neutral position and engage the master clutch after a predetermined time in order to protect a clutch collar of said master clutch;
2. The control unit performs the operations of:
   shifting the gearbox into a neutral position;
   and, if the PTO is enabled, disables the PTO;
3. The control unit performs the engaging of the master clutch.

As can be readily understood, it is not essential in which order the checking of the different statuses in the first paragraph is made and it is also obvious that the control actions performed in the second paragraph may change order. The specific order of paragraph 2 must not be as listed above. However, it is naturally an advantage to shift the gear to neutral before engaging the master clutch which action otherwise may ruin the gear. It is also preferred that the PTO is disabled before the master clutch is engaged in order to avoid that the implement connected to the PTO may perform any undesired actions as it will be powered when the master clutch is engaged.

The step wherein the control unit receives an indication that there is a desire to automatically engage the master clutch and shift the gear into neutral position may be based on several different criteria, either one criterion alone or several criteria together. Preferably this indication is based on at least one input signal indicating that the speed of the vehicle is zero or virtually zero together with another signal indicating for example that a certain time period has lapsed, a parking brake is locked, there is no input from the driver to the accelerator pedal or brake pedal, a door is opened and/or that the driver has left the seat. Hence, there may be several different indications which, either alone or together, sets up the criteria for a shift of the gearbox to a neutral position.

This security control method is based on the feature that when there is an automatic change from a first non-driving mode in which the power-take off is disabled (e.g. represented by having the master clutch disengaged) to a second non-driving mode in which the power-take off may work (e.g. represented by having the master clutch engaged and the gearbox in neutral position) it shall, according to an aspect of the invention, assure that the PTO still not will be able to work by automatically disabling the PTO, even if a PTO switch for enabling/disabling said PTO is set to an PTO enabled position.

As a specific use of the present invention it may be exemplified by the fact that automatic gearboxes, for example such as described in the background art, are often provided with a system for enhancing the durability of a clutch collar (release bearing) of said master clutch. This is commonly achieved by automatically shifting a gearbox that is in an engaged gear position to its neutral position. The gearshift from an engaged gear position to a neutral position of the gearbox may be triggered by a number of different conditions. For example, in such a condition that a brake is operated to stop a vehicle for a while, a master clutch is disengaged leaving the gearbox with an engaged gear. If a sensor detects such a condition that a gear selection lever is in a position other than its neutral position (e g drive position) while for example a vehicle speed sensor and a timer detects such that the stopping of the vehicle is sustained, then the engaged gear will be automatically be changed to a neutral position of the gearbox after a predetermined time so that the master clutch can be engaged. With this arrangement the rotation of a clutch collar comes to a stop, thereby it is possible to prevent the clutch collar from being worn.

As described in the background art, there is no power fed to the PTO when the master clutch is disengaged in case of a clutch-dependent PTO. Hence, there is no risk that implements associated with the PTO will be unintentionally used. However, the automatic control to reengage the master clutch in the foregoing example while shifting the gear to its neutral position will enable the use of implements associated with the PTO since it is now powered by the engine. This may lead to unintentional use of implements associated with the PTO. A particular danger in this case is that the driver may not be aware of the automatic change and therefore is not aware of the possibility to use implements. As a consequence, unintentional use may occur, e.g. the unload of tipping units, cranes releasing its load, hook loaders which may start to swing or pumps starting to pump from various containers. Therefore it exists a need, in a vehicle equipped with a clutch-dependent PTO and an automated gearbox, to assure that undesired engagement of the clutch-dependent PTO is prevented.

As an additional feature it may be possible to program the control unit to return the settings as they were before there were an automatic shift of the gearbox to a neutral position while disengaging the master clutch and disabling the PTO. In this case, the control unit has stored the gearbox position, the status of the power take-off and the master clutch engagement status, which was present immediately before there was an automatic change made as described above. Hence, if there is an indication that the original setting of these parts of the power train system shall be restored, the control unit sends output signals to restore the gearbox position, the status of the power take-off and the master clutch engagement status as it was immediately before the automatic shift was performed.

The indication to perform this resetting may for example be, in case the change to a neutral position was triggered by activation of the parking brake or the absence of a person in the driver's seat, that the driver re-enters his seat or the parking brake is deactivated. An additional criteria for performing the re-adjustment of the master clutch, the gear and the PTO may be that there has been no intentional change, e.g. a driver manipulated change of the gears back and forth, in any of their states before a re-adjustment is to be made. On the other hand, it may be possible that any kind of driver activated manipulation of the PTO, the acceleration or brake pedal, the gear selection lever or the clutch may be used as an indication to restore the original settings. The condition for restoring the original settings will depend on what condition it was that triggered the change in the first place. The conditions for resetting are therefore a complex procedure since it may very well be the case that the same event may give rise to different indications concerning resetting or not resetting the original state.

However, it is possible that the following control sequence may be applied:
1. The control unit registers that:
   the master clutch is engaged;
   the gearbox is in a neutral position;
   the PTO is disabled;
   There is an indication that there is a desire to automatically shift the gearbox into an original engaged gear position with the master clutch in a disengaged position;
2. The control unit performs the disengaging of the master clutch;
3. The control unit performs the operations of:
   shifting the gearbox into its original engaged gear position;
   and, if the PTO is disabled now and was enabled in the original state, enables the PTO;

As an alternative to detecting the engagement of the master clutch and/or that the gearbox is in the neutral position and/or the PTO is disabled as described in paragraph 1, it may be controlled that no gear shift, clutch disengagement or use of the PTO has been made since the automatic control shift operation occurred. The order of the actions is preferably as described above, i.e. the disengaging of the master clutch in paragraph 2 is performed before the actions in paragraph 3, i.e. the gearbox is shifted to its original position and the enabling of the PTO, are performed. However, the order of the actions in paragraph 3 may be altered if the master clutch (paragraph 2) is disengaged before.

When it is referred to "original position" and "original state" in this context is meant the states before there was an automatic shift of the gearbox and the master clutch.

BRIEF DESCRIPTION OF DRAWINGS

The present invention will be described in greater detail below with reference to the accompanying drawing, which, for the purpose of exemplification, show further preferred embodiments of the invention and also the technical background.

DETAILED DESCRIPTION

Figure 1:
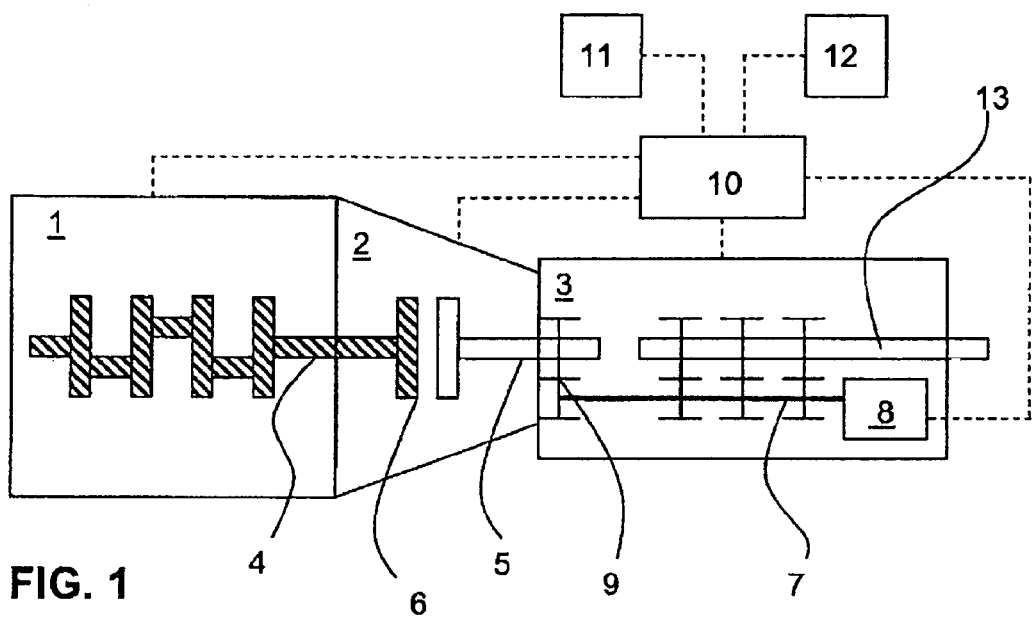
FIG. 1 shows a diagrammatic representation of an internal combustion engine with adjacent master clutch and a gearbox comprising an input shaft, an intermediate shaft and an output shaft.

In FIG. 1, reference number 1 designates an internal combustion engine, for example a diesel engine, reference number 2 designates a master clutch assembly and reference number 3 designates an automatic gearbox, for example a stage-geared gearbox. The master clutch 2 is adapted to effectuate the change between engagement and disengagement of the crankshaft 4 of the engine 1 and the input shaft 5 in the gearbox 3. In this case the working part of the master clutch 2 is illustrated as a disc clutch 6. The gearbox 3 is further provided with an intermediate shaft 7 which is coupled to a power take-off (PTO) 8 and an output shaft 13 for driving the wheels of the vehicle.

The torque transmitted from the input shaft 5 to the intermediate shaft 7 is transmitted by means of a gearwheel connection 9. In this schematic view there are three further gearwheel connections illustrated connecting the intermediate shaft 7 and the output shaft 13. However, there may be any desired number of gearwheel connections or other kind of gears in a gearbox controlled according to aspects of the invention. The output shaft 13 can be connected directly to a propeller shaft (not shown) which conveys the driving power out to the driving wheels (not shown) or can be connected to e.g. a range gear (not shown) which in turn is connected to the propeller shaft.

In this figure, the PTO 8 is connected to the intermediate shaft 7. However, in view of the present invention, the PTO might as well be connected directly to the input shaft 5.

The detailed construction of the gearbox is not essential to the invention and the exemplified gearbox 3 is only for illustrative purpose. However, for a more detailed description of this kind of gearbox we refer to the gearbox described in WO 2004/030973, in particular FIG. 2.

Figure 2:
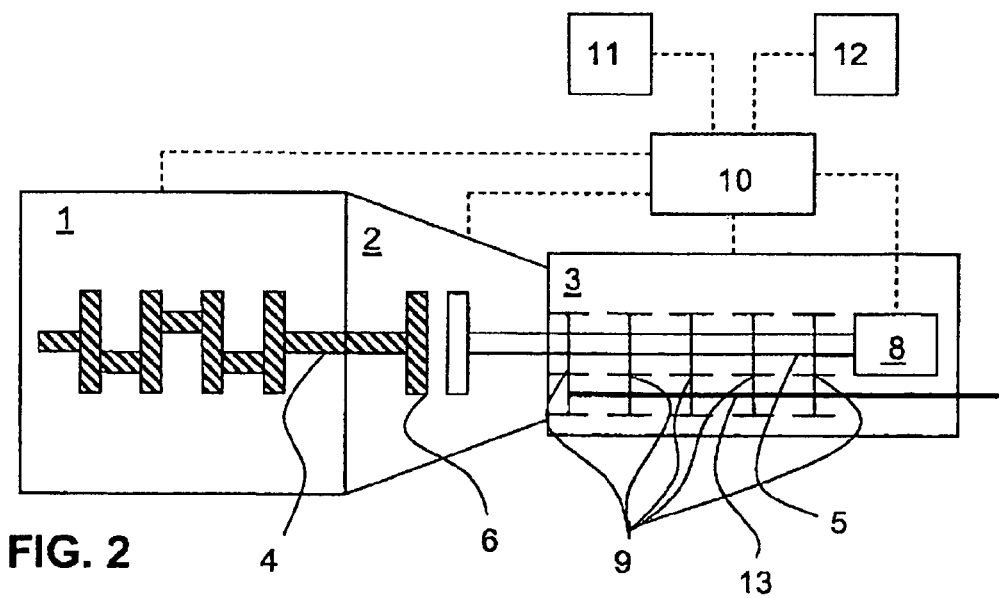
FIG. 2 shows a diagrammatic representation of an internal combustion engine with adjacent master clutch and a gearbox comprising an input shaft and an output shaft.

In FIG. 2, of the present application, still another embodiment of the present invention is shown. In this case, the gear box 3 is exemplified as a so called dropbox. In this case, there is no intermediate shaft present but only an input shaft 5 and an output shaft 13 connected by gearwheel connections 9. In this case, the PTO 8 is connected to the input shaft 5. The reference numbers in FIG. 2 not mentioned here are indicating the same corresponding details as described for FIG. 1.

The automotive transmission system comprising the engine 1, the master clutch 2 and the gearbox 3 is connected to a control unit 10 which is adapted to receive input data, process relevant data and send output signals to control different parts of the automotive drive system. The control unit 10 is further connected to the PTO 8 and adapted to receive inputs from a gear selector 11 as well as an on/off switch 12 for the PTO 8. The control unit 10 may of course also be connected to other indicators or sensors such as door sensors, (parking) brake sensors, presence of the driver in the driver's seat, outdoor temperature, oil temperature etc. such that signals fed into the control unit representing various engine, vehicle and environmental data may be used in order to control the system depending on desired parameters.

In the case of engaging the master clutch 2 according to the present invention, the control unit 10 is programmed so that when it registers:

the master clutch 2 is disengaged;
a gear is engaged in the gearbox 3 (i.e. the gear is not in neutral position);
and that appropriate given conditions are met based on one or several input signals, for example that the vehicle has been stationary and/or that a parking brake (not shown) arranged in the vehicle has been applied for a certain time, there is a desire to automatically put the gearbox in a neutral position and engage the master clutch after a predetermined time in order to protect a clutch collar of said master clutch 2.

Accordingly, the control unit 10 performs the operations of:

shifting the gearbox into a neutral position;
and, if the PTO is enabled (e.g. the PTO switch 12 is switched "ON"), disables the PTO 8 (e.g. the switch 12 is automatically switched. "OFF".

The control unit 10 further also performs the engaging of the master clutch 2. One underlying reason for wanting to engage the master clutch 2 may be to prolong the lifetime of a clutch collar (not shown) associated with the master clutch 2, which clutch collar is worn when the master clutch is disengaged.

In some cases it might be desirable to return the original settings of the system to the state as it was before the control unit 10 performed the automatic adjustment of the gearbox 3, the master clutch 2 and the PTO 8. In this case, the control unit 10 is programmed to engage the master clutch 2, shift the gearbox 3 to its original position and turn on the power take off switch 12 provided it was turned on before the automatic adjustment was made.

When it is referred to "original settings" and "original state" in this context is meant the states before there was an automatic shift of the gear and the master clutch.

In an embodiment of the invention, the driver of the vehicle can advantageously be provided with feedback about the occurrence of the automatic disengaging/engaging function of the master clutch 2 by means of an indicator lamp and/or information on a display or another information device connected to the vehicle.

It shall be noted that the present invention is suitable for all kind of different clutch assemblies, engines and gearboxes which are connected to a clutch dependent PTO and the embodiments shown herein only serve as an example of the invention.

The invention claimed is:

1. An automatic disengaging method for a master clutch dependent power take-off arranged in a vehicle, the power take-off being driven by an engine via a master clutch adapted to effectuate a change between engagement and disengagement of a crankshaft of the engine and an input shaft in a gearbox, the gearbox further comprising an output shaft powered by the input shaft and a power take-off connected to the input shaft, the master clutch and the gear box being connected to and controlled by a control unit, the method comprising:

registering via the control unit when:
the master clutch is disengaged; and
a gear is engaged; and
there is an indication of a desire to automatically put the gearbox in a neutral position and engage the master clutch after a predetermined time in order to protect a clutch collar of the master clutch;
sending an output signal from the control unit to
shift the gearbox into a neutral position;
disable the power take-off, if the power take-off is enabled; and
engage the master clutch.

2. The method according to claim 1, comprising shifting the gearbox into a neutral position before the master clutch is engaged.

3. The method according to claim 2, comprising disabling the power take-off before the master clutch is engaged.

4. The method according to claim 2, wherein the indication of a desire to automatically engage the master clutch and shift the gearbox into a neutral position is at least one of determining that the speed of the vehicle is zero, activating a parking brake, opening a door to a vehicle cab, a driver leaving a driver's seat, and receipt of no input from the driver to the accelerator pedal or brake pedal.

5. The method according to claim 2, comprising storing in the control unit original settings including a gearbox position, a status of the power take-off and the master clutch engagement status immediately before sending the output signal, detecting via the control unit an indication of a desire to restore original settings, sending another output signal to restore the gear position, the status of the power take-off and the master clutch engagement status to the original settings.

6. The method according to claim 2, wherein the indication of the desire to restore the original settings is at least one of a person re-entering a driver's seat, deactivating the parking brake, or deliberate manipulation of at least one of the power take-off, the acceleration, brake pedal, the gear selection lever or the master clutch.

7. The method according to claim 1, comprising disabling the power take-off before the master clutch is engaged.

8. The method according to claim 1, wherein the indication of a desire to automatically engage the master clutch and shift the gearbox into a neutral position is at least one of determining that the speed of the vehicle is zero, activating a parking brake, opening a door to a vehicle cab, a driver leaving a driver's seat, and receipt of no input from the driver to the accelerator pedal or brake pedal.

9. The method according to claim 1, comprising storing in the control unit original settings including a gearbox position, a status of the power take-off and the master clutch engagement status immediately before sending the output signal, detecting via the control unit an indication of a desire to restore original settings, sending another output signal to restore the gear position, the status of the power take-off and the master clutch engagement status to the original settings.

10. The method according to claim 1, wherein the indication of the desire to restore the original settings is at least one of a person re-entering a driver's seat, deactivating the parking brake, or deliberate manipulation of at least one of the power take-off, the acceleration, brake pedal, the gear selection lever or the master clutch.

* * * * *